United States Patent

Hung

(10) Patent No.: US 7,463,316 B2
(45) Date of Patent: Dec. 9, 2008

(54) BACKLIGHT MODULE WITH LIGHT SOURCE REFLECTOR HAVING WIDER TOP PLATE AND LIQUID CRYSTAL DISPLAY WITH SAME

(75) Inventor: Wei-Hao Hung, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 231 days.

(21) Appl. No.: 11/645,410

(22) Filed: Dec. 26, 2006

(65) Prior Publication Data

US 2007/0147090 A1 Jun. 28, 2007

(30) Foreign Application Priority Data

Dec. 23, 2005 (TW) .............................. 94146319 A

(51) Int. Cl.
G02F 1/1335 (2006.01)
(52) U.S. Cl. ........................................ 349/62
(58) Field of Classification Search .................... 349/62
See application file for complete search history.

(56) References Cited

U.S. PATENT DOCUMENTS 6,480,248 B1 11/2002 Lee et al.
7,298,434 B2 * 11/2007 Jeon ............................. 349/62

* cited by examiner

*Primary Examiner*—David Nelms
*Assistant Examiner*—Phu Vu
(74) *Attorney, Agent, or Firm*—Wei Te Chung

(57) ABSTRACT

An exemplary backlight module (12) includes a light guide plate (15) and a light source (17). The light guide plate includes a light incident surface (152), a top surface (154) connected with the light incident surface, and a bottom surface (156) opposite to the top surface. The light source includes an illuminator (172) located adjacent the light incident surface, and a light source reflector (19) cooperating with the light incident surface to generally surround the illuminator. The light source reflector includes a top plate (194) abutting a first end portion of the top surface of the light guide plate, and a bottom plate (196) abutting a second end portion of the bottom surface of the light guide plate. The bottom plate is narrower than the top plate.

20 Claims, 3 Drawing Sheets

BACKLIGHT MODULE WITH LIGHT SOURCE REFLECTOR HAVING WIDER TOP PLATE AND LIQUID CRYSTAL DISPLAY WITH SAME

FIELD OF THE INVENTION

The present invention relates to a backlight module with a light source reflector having a top plate and a bottom plate, the bottom plate being narrower than the top plate. The present invention also relates to a liquid crystal display that includes the backlight module.

GENERAL BACKGROUND

Liquid crystal displays are commonly used as displays for compact electronic apparatuses, because they not only provide good quality images with little power but are also very thin. The liquid crystal in a liquid crystal display does not emit any light itself. The liquid crystal has to be lit by a light source so as to clearly and sharply display text and images. Thus, a backlight module is generally needed for a liquid crystal display.

Referring to FIG. 4, a typical backlight module 40 includes a light guide plate 41, a light source 43, a reflective film 45, and a bottom tray 47. The light guide plate 41, the light source 43, and the reflective film 45 are received in the bottom tray 47. The light guide plate 41 includes a light incident surface 412, a bottom surface 414 perpendicularly connected with the light incident surface 412, and a top surface 416 opposite to the bottom surface 414. The reflective film 45 is attached to the bottom surface 414 of the light guide plate 41. The light source 43 is located adjacent the light incident surface 412, and includes an illuminator 48, and a light source reflector 49 cooperating with the light incident surface 412 to generally surround the illuminator 48. The bottom tray 47 includes a planar bottom plate 472 adjacent the reflective film 45.

The light source reflector 49 has a symmetrically U-shaped profile. The light source reflector 49 includes a curved connection board 492, a top board 494, and a bottom board 496. The top board 494 and the bottom board 496 respectively extend from two opposite sides of the connection board 492, and are parallel to each other, thereby defining an opening (not labeled). The top board 494 and the bottom board 496 have a same width, and a distance therebetween is slightly greater than a total thickness of the light guide plate 41 and the reflective film 45. The top board 494 abuts an end portion (not labeled) of the top surface 416 of the light guide plate 41, and the bottom board 496 abuts an end portion (not labeled) of a bottom side (not labeled) of the reflective film 45.

In assembly of the backlight module 40, a step of aligning the light guide plate 41 attached with the reflective film 45 with the opening of the light source reflector 49 is needed, which makes the assembly of the backlight module 40 inconvenient and adds to the cost of manufacturing the backlight module 40.

What is needed, therefore, is a backlight module that can overcome the above-described deficiencies. What is also needed is a liquid crystal display employing such a backlight module.

SUMMARY

In one preferred embodiment, a backlight module includes a light guide plate and a light source. The light guide plate includes a light incident surface, a top surface connected with the light incident surface, and a bottom surface opposite to the top surface. The light source includes an illuminator located adjacent the light incident surface, and a light source reflector cooperating with the light incident surface to generally surround the illuminator. The light source reflector includes a top plate abutting a first end portion of the top surface of the light guide plate, and a bottom plate abutting a second end portion of the bottom surface of the light guide plate. The bottom plate is narrower than the top plate.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
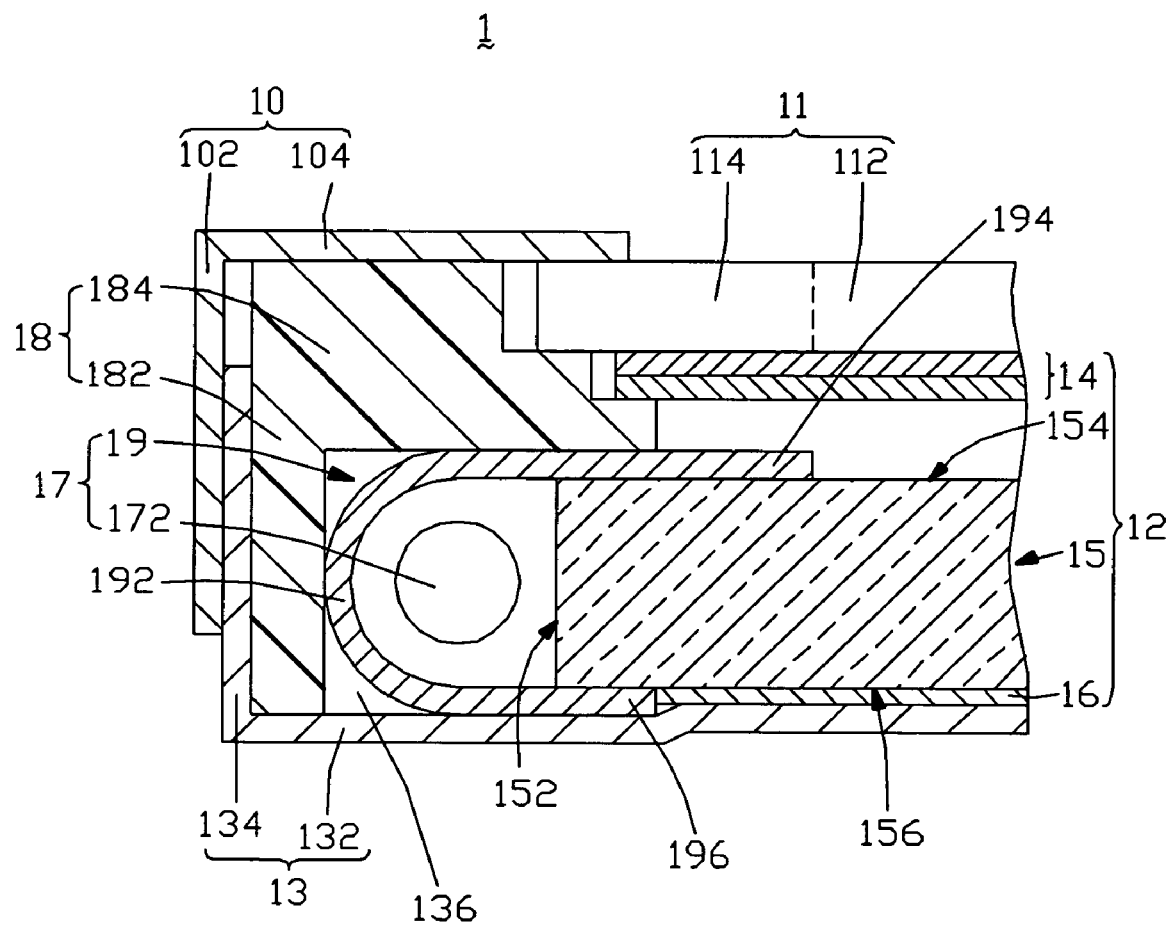
FIG. 1 is a side, cross-sectional view of part of a liquid crystal display according to a first embodiment of the present invention, the liquid crystal display including a backlight module that employs a light guide plate and a light source reflector.

Referring to FIG. 1, a liquid crystal display 1 according to a first embodiment of the present invention is shown. The liquid crystal display 1 includes a top bezel 10, a liquid crystal panel 11, a backlight module 12, and a bottom tray 13. The liquid crystal panel 11 is located adjacent the backlight module 12, and includes a display area 112 and a non-display area 114 surrounding the display area 112. The liquid crystal panel 11 and the backlight module 12 are received in a first space (not labeled) cooperatively defined by the top bezel 10 and the bottom tray 13.

The backlight module 12 includes an optical film assembly 14, a light guide plate 15, a reflective film 16, a light source 17, and a plastic frame 18. The optical film assembly 14, the light guide plate 15, and the reflective film 16 are arranged in that order from top to bottom.

The light guide plate 15 includes a light incident surface 152, a top surface 154 perpendicularly connected with the light incident surface 152, and a bottom surface 156 opposite to the top surface 154. The light source 17 is located adjacent the light incident surface 152, and includes an illuminator 172, and a light source reflector 19 cooperating with the light incident surface 152 to generally surround the illuminator 172. The illuminator 172 can for example be a cold cathode fluorescent lamp (CCFL). In an alternative embodiment, the illuminator 172 can be one or more light emitting diodes (LEDs). The light guide plate 15 can for example be made from polycarbonate (PC) or polymethyl methacrylate (PMMA), and can be manufactured by an injection molding method.

The light source reflector 19 has an asymmetrically U-shaped profile. The light source reflector 19 includes a curved connection board 192, and an elastic top board 194 and an elastic bottom board 196 extending from two ends of the connection board 192 respectively. The top board 194 and the bottom board 196 are substantially planar, and are parallel to each other. The bottom board 196 is narrower than the top board 194, and a distance between the top board 194 and the bottom board 196 is slightly greater than a thickness of the light guide plate 15. The top board 194 abuts an end portion (not labeled) of the top surface 154 of the light guide plate 15, and the bottom board 196 abuts an end portion (not labeled) of the bottom surface 156 of the light guide plate 15. The top board 194 corresponds to the non-display area 114 of the liquid crystal panel 11, and an edge (not labeled) thereof corresponds to a boundary of the display area 112 and the non-display area 114 of the liquid crystal panel 11. That is, light beams emitted from the light guide plate 15 can pass to the display area 112 of the liquid crystal panel 11 without being blocked by the top board 194 of the light source reflector 19. The light source reflector 19 is preferably made from aluminum, or magnesium, or another suitable material.

The reflective film 16 is attached to the bottom surface 156 of the light guide plate 15, and an end (not labeled) thereof fittingly contacts an end of the bottom board 196, thereby preventing the light beams of the backlight module 12 from leaking through the bottom surface 156 of the light guide plate 15.

The top bezel 10 includes a plurality of side pieces 102 (only one shown), and a top piece 104 perpendicularly connected with the side pieces 102. The top bezel 10 partially surrounds the non-display area 114 of the liquid crystal panel 11, thus allowing view of the display area 112 of the liquid crystal panel 11. The top piece 104 abuts the non-display area 114 of the liquid crystal panel 11. The top bezel 10 is preferably made from iron, aluminum, or magnesium, a suitable alloy thereof, or another suitable alloy.

The plastic frame 18 includes a plurality of side walls 182 (only one shown), and a plurality of supporting walls 184 (only one shown) extending perpendicularly inwardly from the side wall 182. Each supporting wall 184 defines two adjacent steps (not labeled). The liquid crystal panel 11 and the optical film assembly 14 are respectively supported by the steps of the supporting walls 184.

The bottom tray 13 includes a bottom plate 132, and a plurality of side plates 134 (only one shown) perpendicularly extending from corresponding ends of the bottom plate 132. Each side plate 134 is located between the corresponding side piece 102 of the top bezel 10 and the corresponding side wall 182 of the plastic frame 18. The bottom tray 13 defines a cavity 136 adjacent the light incident surface 152 of the light guide plate 15, for accommodating the light source reflector 19.

Figure 2:
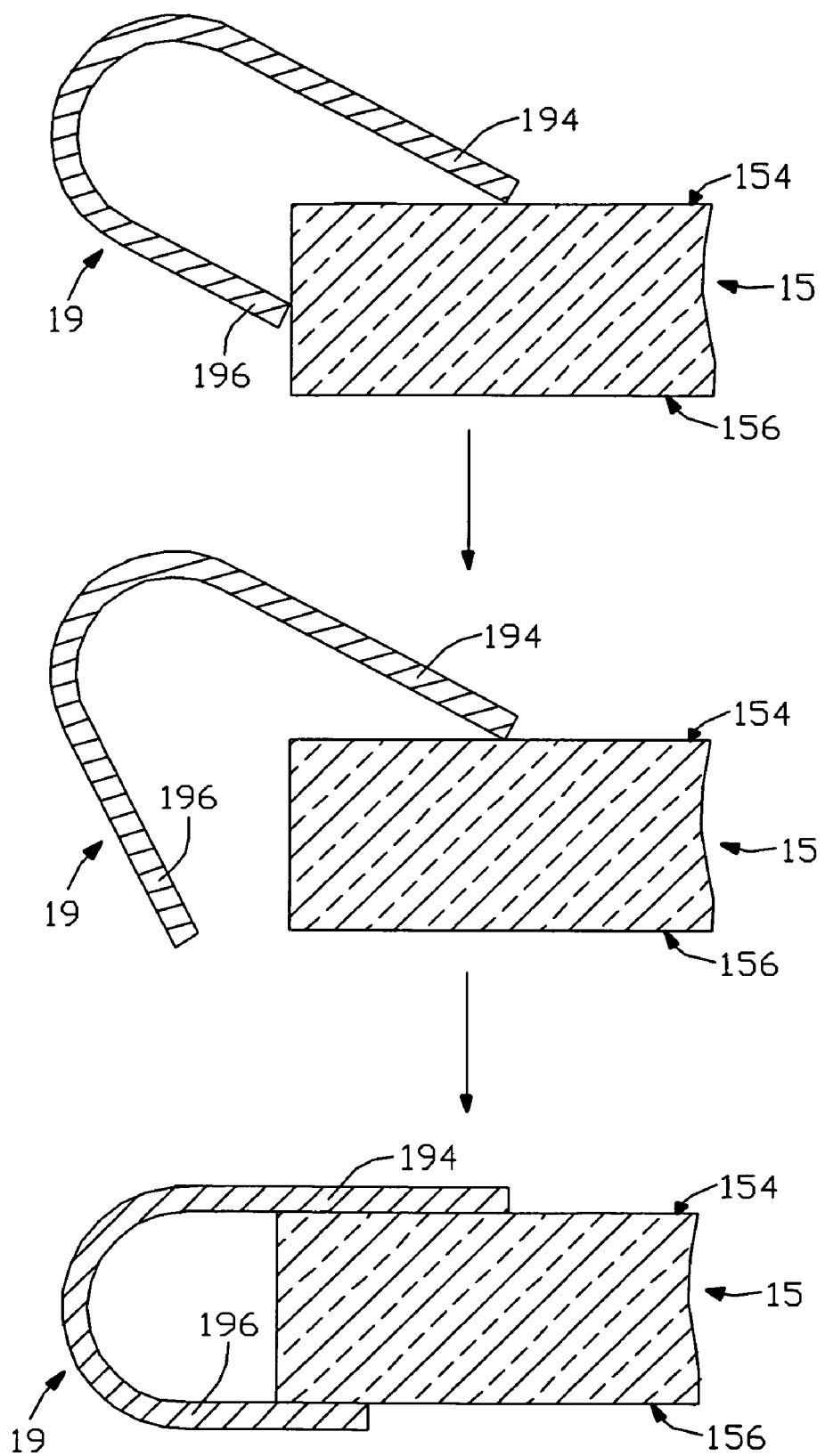
FIG. 2 is a side, cross-sectional view showing sequential steps of attaching the light source reflector to the light guide plate in assembly of the backlight module of FIG. 1.

The liquid crystal display 1 can be assembled as follows. First, the reflective film 16 is disposed at the bottom plate 132 of the bottom tray 13. A small end portion of the reflective film 16 is slightly suspended over a sunken portion of the bottom plate 132 at the cavity 136. Second, the light guide plate 15 is disposed on the reflective film 16. End portions of the top surface 154 and the bottom surface 156 protrude into the cavity 136, with the corresponding ed portion of the light guide plate 15 suspended over the sunken portion of the bottom plate 132 in the cavity 136. Further, the end portion of the light guide plate 15 is longer than that of the reflective film 16, thereby defining a second space (not labeled) between the bottom surface 153 of the light guide plate 15 and the sunken portion of the bottom plate 132. Third, the light source reflector 19 having the illuminator 172 received therein is disposed in a preassembly position. Referring also to FIG. 2, the edge of the top plate 194 slightly contacts the end portion of the top surface 154, and an edge of the bottom plate 196 slightly abuts the light incident surface 152. Fourth, the top plate 194 of the light source reflector 19 is pressed toward the bottom plate 132. The opening of the light source reflector 19 is expanded until the light incident surface 152 is received in the light source reflector 19. The bottom plate 196 then enters the second space until the top plate 194 and the bottom plate 196 are parallel to each other again. That is, the top plate 194 fittingly abuts the end portion of the top surface 154, and the bottom plate 196 fittingly abuts the end portions of the bottom surface 156. The end of the bottom plate 196 slightly contacts the corresponding end of the reflective film 16. Fifth, the plastic frame 18 is assembled in the bottom tray 13. The side wall 182 fittingly abuts an outer surface (not labeled) of the connection board 192 of the light source reflector 19, and the supporting wall 184 abuts portions of the top plate 194 of the light source reflector 19. Sixth, the optical film assembly 14 is received in the plastic frame 18, and is supported by the step. Seventh, the liquid crystal panel 11 is disposed on the optical film assembly 14, and is also supported by the step. Finally, the top bezel 10 is pressed onto the plastic frame 18, such that the top bezel 10 abuts the supporting wall 184 of the plastic frame 18 and fittingly abuts the side plates 134 of the bottom tray 13. The top bezel 10 and the bottom tray 13 cooperatively accommodate the liquid crystal panel 11 and the backlight module 12.

The light source reflector 19 is pressed to be assembled with the light guide plate 15, without the need for aligning the light guide plate 15 with the opening of the light source reflector 19 and pressing part of the light guide plate 15 into the light source reflector 19. This results in convenient assembly of the backlight module 12 and the liquid crystal display 1, thereby reducing the cost of manufacturing the backlight module 12 and the liquid crystal display 1.

Figure 3:
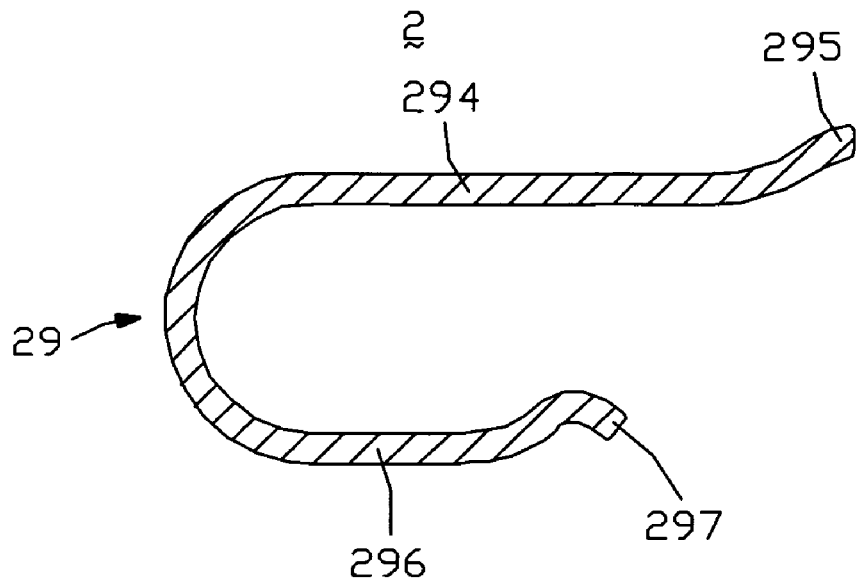
FIG. 3 is a side, cross-sectional view showing a light source reflector of a liquid crystal display according to a second embodiment of the present invention.
Figure 4:
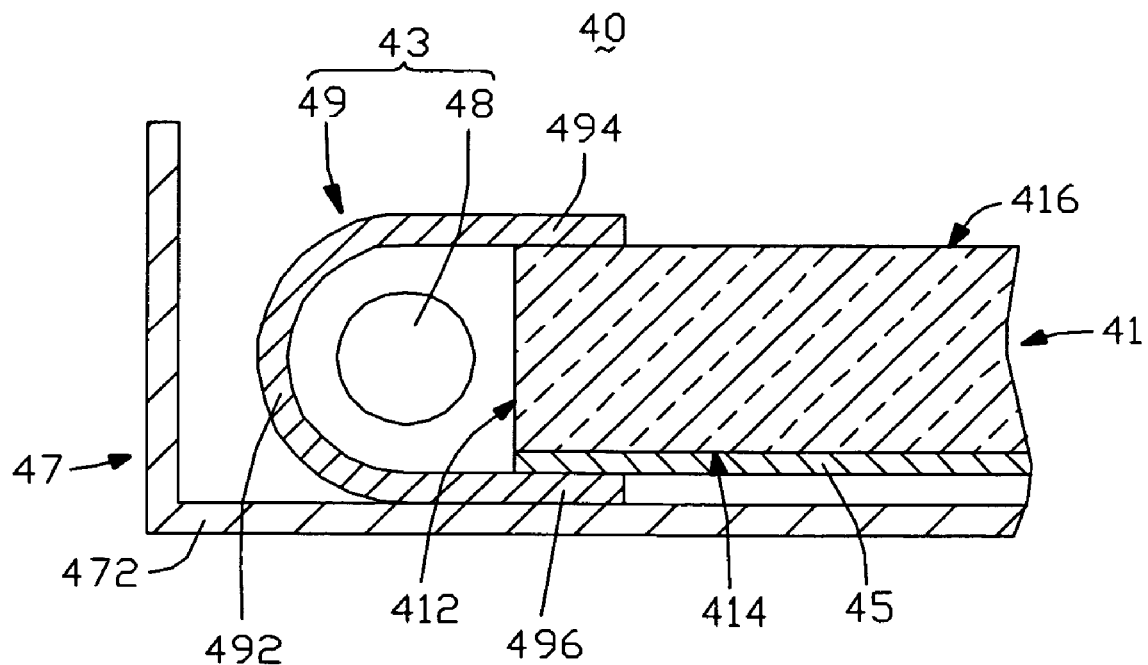
FIG. 4 is a side, cross-sectional view of part of a conventional backlight module.

In FIG. 3, a light source reflector 29 of a liquid crystal display 2 according to a second embodiment of the present invention is similar to the light source reflector 19 of the liquid crystal display 1. The light source reflector 29 includes a top plate 294, and a bottom plate 296 substantially parallel to the top plate 294. The top plate 294 includes a curved first end portion 295 extending away from a top surface of a light guide plate (not sown) of the liquid crystal display 2. The bottom plate 296 includes a curved second end portion 297. The second end portion 297 includes a back extending toward the top plate 294, and an end extending away from the top plate 294. The first end portion 295 and the second end portion 297 can help to prevent the top surface and the bottom surface of the light guide plate being scraped. The liquid crystal display 2 has advantages similar to those of the above-described liquid crystal display 1.

Further or alternative embodiments may include the following. In one example, the reflective film 16 is held by the bottom plate 196 of the light source reflector 19. In this case, the distance between the top plate 194 and the bottom plate 196 of the light source reflector 19 is slightly greater than a total thickness of the light guide plate 15 and the reflective film 16.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
a light guide plate comprising:
a light incident surface;
a top surface adjacent the light incident surface; and
a bottom surface opposite to the top surface;
a light source comprising:
an illuminator located adjacent the light incident surface; and
a light source reflector cooperating with the light incident surface to generally surround the illuminator, the light source reflector comprising:
a top plate abutting a first end portion of the top surface of the light guide plate; and
a bottom plate abutting a second end portion of the bottom surface of the light guide plate, the bottom plate being narrower than the top plate.

2. The backlight module in claim 1, further comprising a bottom tray receiving the light guide plate and the light source.

3. The backlight module in claim 2, wherein the bottom tray and the bottom surface cooperative define a space, the bottom plate entering the space and abutting the second end portion of the bottom surface.

4. The backlight module in claim 1, wherein the top plate and the bottom plate are elastic.

5. The backlight module in claim 1, wherein the top plate and the bottom plate are parallel to each other.

6. The backlight module in claim 5, wherein a distance between the top plate and the bottom plate is greater than a corresponding thickness of the light guide plate.

7. The backlight module in claim 1, wherein the top plate is planar.

8. The backlight module in claim 1, wherein the top plate comprises a curved end portion, and the curved end portion is configured for minimizing any scraping by the top plate of the first end portion of the top surface of the light guide plate.

9. The backlight module in claim 8, wherein the end portion of the top plate extends away from the first end portion of the top surface of the light guide plate.

10. The backlight module in claim 1, wherein the bottom plate is planar.

11. The backlight module in claim 1, wherein the bottom plate comprises a curved end portion, and the curved end portion is configured for minimizing any scraping by the bottom plate of the second end portion of the bottom surface of the light guide plate.

12. The backlight module in claim 11, wherein the end portion of the bottom plate comprises an inner section extending toward the second end portion of the bottom surface of the light guide plate, and an outer section extending away from the second end portion of the bottom surface of the light guide plate.

13. The backlight module in claim 5, further comprising a reflective film attached to the bottom surface of the light guide plate.

14. The backlight module in claim 13, wherein a distance between the top plate and the bottom plate is greater than a total thickness of the light guide plate and the reflective film.

15. The backlight module in claim 1, wherein the light source reflector is made from aluminum or magnesium.

16. A liquid crystal display comprising:
a liquid crystal panel; and
a backlight module located adjacent the liquid crystal panel, the backlight module comprising:
a light guide plate comprising:
a light incident surface;
a top surface adjacent the light incident surface; and
a bottom surface opposite to the top surface;
a light source comprising:
an illuminator located adjacent the light incident surface; and
a light source reflector cooperating with the light incident surface to generally surround the illuminator, the light source reflector comprising:
a top plate abutting a first end portion of the top surface of the light guide plate; and
a bottom plate abutting a second end portion of the bottom surface of the light guide plate, the bottom plate being narrower than the top plate.

17. A method of assembling a backlight module comprising steps of:
providing a light guide plate with opposite top and bottom surfaces and a incident surface on a lateral side therebetween;
providing a light source with an illuminator located adjacent the light incident surface, and with a light source reflector cooperating with the light incident surface to generally surround the illuminator, wherein
the reflector is assembled to a corresponding side of the light guide plate on which the incident surface is formed, under a condition that the reflector defines an opening approaching said incident surface in an oblique manner.

18. The method of assembling the backlight module as claimed in claim 17,
wherein the opening is formed between opposite top and bottom plates of the reflector, and is essentially same as a thickness of the light guide plate.

19. The method of assembling the backlight module as claimed in claim 18,
wherein both of said top and bottom plates are dimensioned larger than a thickness of the light guide plate.

20. The method of assembling the backlight module as claimed in claim 19,
wherein the top plates and the bottom plates are dimensioned different from each other in a direction toward the incident surface.

* * * * *